(12) United States Patent
Urushibata et al.

(10) Patent No.: US 8,011,691 B2
(45) Date of Patent: Sep. 6, 2011

(54) AIR BAG

(75) Inventors: Akito Urushibata, Shizuoka (JP);
Yasuhiro Uchida, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 43 days.

(21) Appl. No.: 11/727,064

(22) Filed: Mar. 23, 2007

(65) Prior Publication Data
US 2007/0252365 A1 Nov. 1, 2007

(30) Foreign Application Priority Data
Apr. 28, 2006 (JP) ................................. 2006-126821

(51) Int. Cl.
*B60R 21/2338* (2006.01)
(52) U.S. Cl. .................................. 280/743.2; 280/730.1
(58) Field of Classification Search ............... 280/730.1, 280/743.1, 743.2, 729
See application file for complete search history.

(56) References Cited

U.S. PATENT DOCUMENTS

| | | | | |
|---|---|---|---|---|
| 3,618,979 A | * | 11/1971 | Gulette | 280/731 |
| 4,934,734 A | * | 6/1990 | Takada | 280/731 |
| 6,536,801 B2 | * | 3/2003 | Frisch | 280/743.1 |
| 6,802,534 B2 | * | 10/2004 | Neupert | 280/743.1 |
| 6,857,659 B2 | * | 2/2005 | Webber | 280/743.2 |
| 7,152,880 B1 | * | 12/2006 | Pang et al. | 280/743.2 |
| 7,195,275 B2 | * | 3/2007 | Abe | 280/729 |
| 2002/0084638 A1 | * | 7/2002 | Neupert | 280/743.1 |
| 2004/0119271 A1 | * | 6/2004 | Webber | 280/731 |
| 2004/0145161 A1 | * | 7/2004 | Hasebe et al. | 280/729 |
| 2005/0104351 A1 | * | 5/2005 | Lorenz | 280/743.1 |
| 2006/0049618 A1 | * | 3/2006 | Bito | 280/732 |
| 2006/0197318 A1 | * | 9/2006 | Choi et al. | 280/729 |

FOREIGN PATENT DOCUMENTS

JP 2006-51884 A 2/2006

* cited by examiner

*Primary Examiner* — Paul N Dickson
*Assistant Examiner* — Timothy D Wilhelm
(74) *Attorney, Agent, or Firm* — Sughrue Mion, PLLC

(57) ABSTRACT

An air bag deployed from a mounted member mounted with the air bag toward an occupant by an insertion of a gas, the air bag includes a front surface portion confronting the occupant, the front surface portion being arranged to be deployed toward the occupant. The front surface portion includes a lower expansion portion arranged to inflate to abut on a breast portion of the occupant, a pair of side expansion portions arranged to inflate to left and right sides of a head portion of the occupant to avoid the head portion of the occupant, and a recessed portion surrounded by the lower expansion portion and the side expansion portions, and recessed toward the mounted member.

9 Claims, 5 Drawing Sheets

AIR BAG

BACKGROUND OF THE INVENTION

This invention relates to an air bag arranged to deploy by inflow of a gas.

Conventionally, for example, there is used an air bag apparatus provided to a boss portion of a steering wheel main body of a vehicle, and in an instrument panel located at a forward position of a passenger seat. This air bag apparatus includes a bag-shaped air bag, and a cover member covering and receiving the air bag in a non-deployment state. The inflator supplies the gas to the air bag at a collision of the vehicle, and the cover member is broken at predetermined tear lines. Consequently, the air bag is inflated and deployed toward a front side, that is an occupant side of an object to be protected, and the air bag restrains and protects the occupant.

For improving deployment characteristics of the air bag, various structures are employed. It is required to suppress the force applied to the occupant, even in a proximate deployment state that the air bag is deployed when the occupant is closer to the air bag apparatus. For example, Publish Japanese Patent Application, KOKAI No. 2006-51884 shows a structure provided with an air bag which is deployed in a ball shape which has no recessed portion in a case that a tether is not provided, and a tether which serves as a regulation member, which is attached to a fixing portion of the inflator, and which regulates protrusion amount of portion of an occupant side of the air bag to form a recessed portion on a surface on the occupant side. In the structure of the patent document 1, the air bag is deployed on the left and right sides of the occupant, and these both side portions support the occupant. Moreover, the tether to suppress the natural deployment of the air bag is needed to support the air bag against the large force at the deployment.

SUMMARY OF THE INVENTION

In the above-described conventional structure, it is required to further decrease impact applied to the occupant. Moreover, in the tether to suppress the natural deployment, it is required to support the air bag against the large force. Accordingly, it is necessary to manufacture by components having large strength, and it is problematic to increase manufacturing cost.

It is, therefore, an object of the present invention to provide an air bag devised to decrease an impact applied to an occupant, to protect the occupant appropriately, and to decrease a manufacturing cost.

According to one aspect of the present invention, an air bag deployed from a mounted member mounted with the air bag toward an occupant by an insertion of a gas, the air bag comprises: a front surface portion confronting the occupant, the front surface portion being arranged to be deployed toward the occupant. The front surface portion includes a lower expansion portion arranged to inflate to abut on a breast portion of the occupant; a pair of side expansion portions arranged to inflate to left and right sides of a head portion of the occupant to avoid the head portion of the occupant; and a recessed portion surrounded by the lower expansion portion and the side expansion portions, and recessed toward the mounted member.

DETAILED DESCRIPTION OF THE INVENTION

Hereinafter, an air bag according to a first embodiment of the present invention will be described in reference to the drawings.

Figure 1:
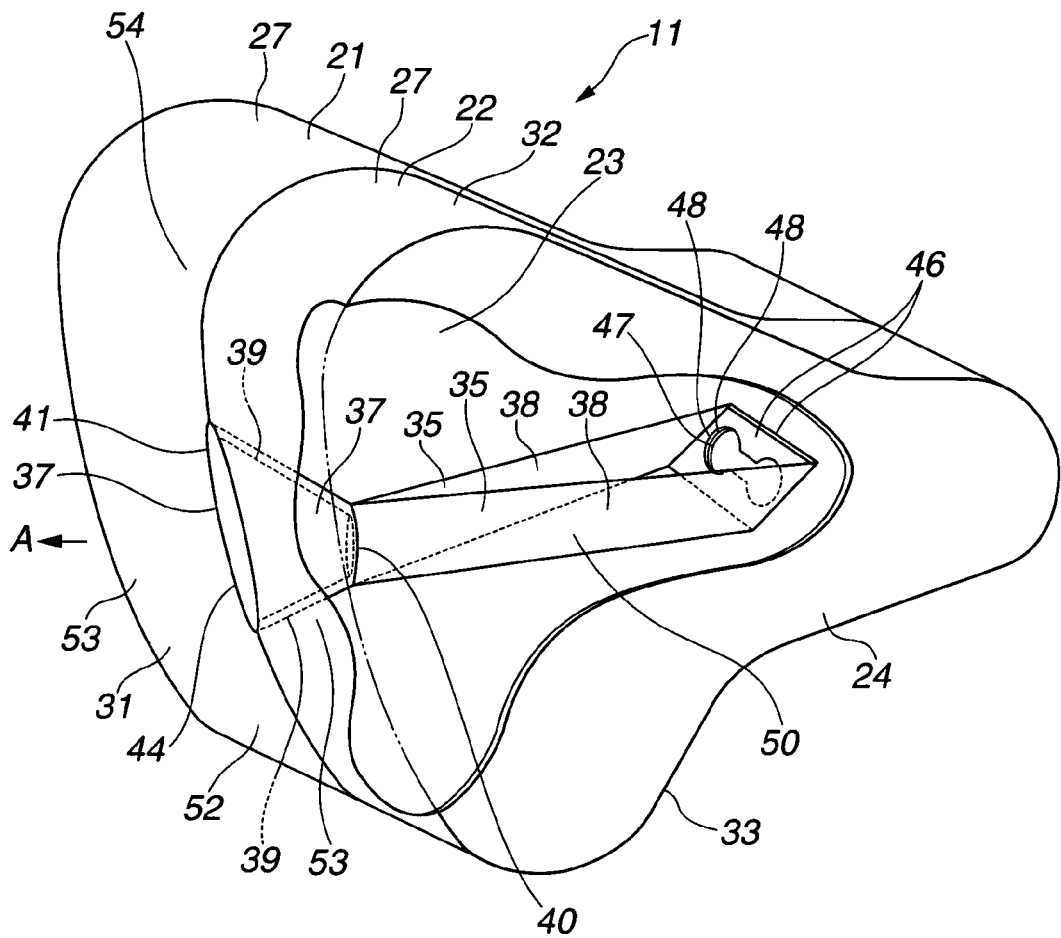
FIG. 1 is a partially cutaway, perspective view showing an air bag in a deployment state, according to a first embodiment of the present invention.
Figure 2:
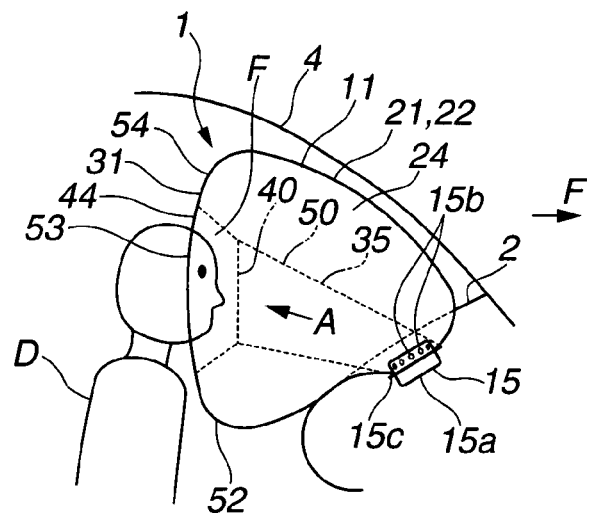
FIG. 2 is an illustrative view showing the air bag of FIG. 1 in the deployment state as viewed from a side.

In FIG. 2, an air bag apparatus 1 is disposed at a forward position of a passenger seat of a vehicle, that is within an instrument panel 2 located at a forward position of occupant D of an object to be protected which is seated in the passenger seat. Air bag apparatus 1 serves as an air bag apparatus for the occupant seated in the passenger seat. Hereinafter, a forward direction (a direction of an arrow F shown in FIG. 2), both side directions (left and right directions), and upward and downward directions are illustrated with respect to an advance direction (straight-ahead direction) of the vehicle equipped with air bag apparatus 1. Occupant D is shown as a dummy. Instrument panel 2 is formed into a smooth curved shape extending from the upward side to the rearward side, that is to the passenger seat side. Air bag apparatus 1 is fixed, in a state that a front face A of air bag apparatus is slightly inclined from the rearward side to the upward side, to a steering member (not shown) forming a mounted member (a member to be mounted), and disposed within instrument panel 2 by screwing and so on. A wind shield 4 is disposed above instrument panel 2, and inclined from the forward lower side to the rearward upper side.

Air bag apparatus 1 includes a bag-shaped air bag 11; a case member (not shown) constituting the mounted member, and serving as a base member; a retainer assembled to the case member; an inflator 15; and a cover member called a lid.

The case member is called a reaction can or a retainer. The case member is formed, by bending or welding sheet metal, into a substantially rectangular shape including a protrusion opening serving as an opening, and located on the substantially front side (left side in FIG. 2). The case member receives the folded air bag 11. The retainer is called a middle retainer. The retainer is disposed within air bag 11, and fixed to the case member to fix air bag 11 in a central position or bottom portion of the case member.

An inflator 15 includes an inflator main portion 15a being in the form of a substantially cylindrical shape or substantially disc shape, and receiving an igniter and agents; a gas injection orifices 15b connected with the inside of inflator main portion 15a; a flange portion 15c; and a connector. In this example, two inflators 15 are used, and provided with the substantially disc-shaped inflator main portions 15a. A part of each inflator 15 is inserted from the outside into the case member and air bag 11, in a state that two inflators 15 are arranged on the both sides. Inflators 15 are fixed to the case-member to sandwich air bag 11 and the case member between the retainer disposed within air bag 11, and flange portions 15c of inflators 15.

In case of using inflators 15 provided with substantially cylindrical inflator main portions, inflators 15 are received within the case member, and fixed to be divided from air bag 11 by the retainer.

The cover member is made from synthetic resin. The cover member is formed as an integral member with instrument panel 2, or formed as a member different from instrument panel 2. The cover member covers the protrusion opening of the case member. This cover member is formed with a breakaway portion which is thinner than other portions, which can be readily broken, and which is in the form of substantially H-shape or substantially C-shape in a plan.

As shown in FIGS. 1~4, air bag 11 is formed into a bag-shaped body whose thickness increases in a direction from the mounted member's side (a base end side) to the front side A (a left side in FIG. 1), in a deployment state without applying the force from the outside, by sewing a base cloth or a plurality of base cloths. In the first embodiment, air bag 11 is mainly formed from four base cloths of a first main panel 21 and a second main panel which are in symmetry, and a first side panel 23 and a second side panel 24 which are in symmetry. These first and second main panels 21 and 22 includes, respectively, band-shaped (belt-shaped) panel main portions 27 and 27. Panel main portions 27 and 27 of first and second main panels 21 and 22 are sewed in a state that panel main portions 27 and 27 are arranged on the both sides. Each of panel main portions 27 and 27 is sewed in a circular annular shape. Consequently, first and second main panels 21 and 22 integrally form a substantially rectangular front surface portion 31 confronting occupant D; and upper surface portion 32 connected with an upper portion of front surface portion 31; and a lower surface portion 33 connected with a lower portion of front surface portion 31. Each of main panels 21 and 22 includes an extension section 35 protruding from a substantially central portion of front surface portion 31. Each of extension sections 35 includes a recessed portion forming portion 37 connected with front surface portion 31, and a connection section forming portion 38 connected with recessed portion forming portion 37. Recessed portion forming portions 37 are sewed with each other at upper and lower end portions 39, and at bottom portions 40 located on the base end's side (that is, the non-front surface A's side, the non-occupant side) of recessed portion forming portions 37, so that recessed portion forming portions 37 are airtightly joined with each other. Besides, recessed portion forming portions 37 are not joined on the front surface A's side, so that a recessed portion 44 is formed on the front surface A's side. Recessed portion 44 includes an opening 41 being in the form of a long slit shape extending in the upward and downward directions. In the first embodiment, recessed portion 44 is in the form of trapezoid as viewed form the side, increasing size in upward and downward directions toward the front surface A's side. Moreover, connection section forming portions 38 of extension portions 35 include, respectively, joining portions 46 each located at one end portion on the base end's side (the right side in FIG. 1), and superimposed with each other. Each of joining portions 46 is formed with an opening 48 connected with an opening 47 formed in panel main portions 27. Inflator main portions 15a of inflators 15 are inserted into these openings 47 and 48. A portion of circumference of opening 47 is sandwiched between the retainer and flange portion 15c of inflator 15. Consequently, a connection section 50 is formed, and serves as a connection cord (string) to fix the bottom portion of recessed portion 44 to the case member forming the mounted member. Moreover, first and second side panels 23 and 24 are substantially airtightly joined to edge portions of cylinders formed by main panels 21 and 22 by sewing and so on, so that first and second side panels 23 and 24 form side surface portions on both sides of air bag 11.

Moreover, front surface portion 31 of air bag 11 includes a lower extension portion 52 located on the lower side of recessed portion 44; side expansion portions 53 located on left and right sides of recessed portion 44; and an upper expansion portion 54 located on the upper side of recessed portion 44. Lower expansion portion 52, side expansion portions 53 and 53, and upper expansion portion 54 surround recessed portion 44. This recessed portion 44 has a size and a position capable of receive head portion F of occupant D.

Besides, an coating may be applied to inner surfaces of panels 21, 22, 23 and 24 which is exposed to, is for example, high temperature gas, to improve heat resistance and air tightness. Moreover, flame proofing fabrics (not shown) serving as supplemental base cloths, and called assist panels may be superimposed on and sewed to panels 21, 22, 23 and 24, to improve the strength and the heat resistance.

In case of the assembly operation of air bag apparatus 1, air bag 11 is folded into a predetermined shape in a state that the retainer is inserted into air bag 11, and the folded shape of air bag 11 may be held by using wrapping members and so on. Then, bolts provided to the retainer are inserted into mounting holes provided around openings 47 and 48, air bag 11 and inflators 15 are fixed to the case member, and air bag 11 is received in the case member. Subsequently, the case member is mounted to instrument panel 2, and the cover member covers the protrusion opening. Moreover, there are provided necessary wirings to connect inflators 15 and a control apparatus, so that air bag apparatus 1 is installed in the vehicle.

In thus-constructed air bag apparatus 1, inflators 15 are activated by a signal from a collision sensing sensor of the control apparatus (not shown) at a collision of the vehicle, and inflators 15 discharge the gas. Then, this gas flows through openings 47 and 48 into air bag 11, so that air bag 11 is inflated and deployed. Subsequently, this air bag 11 presses the cover member from the inside thereof, and the cover member is broken along the breakaway lines, and opened in a door shape, to form the protrusion opening for air bag 11. Air bag 11 is protruded from this protrusion opening, and inflated and deployed to restrain occupant D seated in the passenger seat, to decrease the impact applied to the occupant. In this case, the shape of recessed portion 44 is held by connection section 50, and recessed portion 44 is disposed at a predetermined position.

Figure 3:
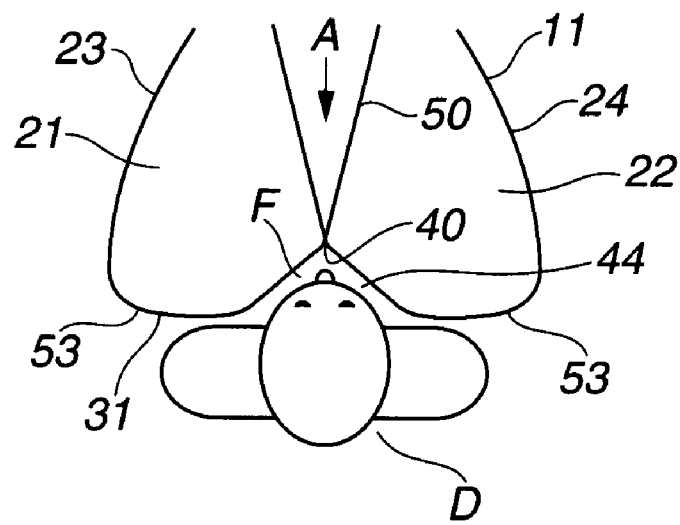
FIG. 3 is an illustrative view showing the air bag of FIG. 1 in the deployment state as viewed from above.

At the inflation deployment of air bag 11, front surface portion 31 confronts occupant D, and moreover recessed portion 44 located at the central portion of front surface portion 31 is set to be disposed to confront head portion F of occupant D. Therefore, air bag 11 does not apply the impact to head portion F of occupant D being inclined forward at the initiation of the deployment, as shown in FIGS. 2 and 3. Low expansion portion 52 abuts on a chest portion of occupant D, that is portion of root (base) of the neck below a jaw, and side expansion portions 53 and 53 are inflated to vary the shapes thereof to avoid head portion F, and abut on shoulder portions of occupant D. Consequently, air bag 11 abuts on the occupant at least at the three portions to protect and restraint the occupant. Moreover, in this embodiment, upper expansion portion 54 is inflated to vary the shape thereof to avoid head portion F of the occupant, and enfolds and protects head portion F of occupant D with the upper portions of side expansion portions 53 and 53 on the both sides.

Figure 4:
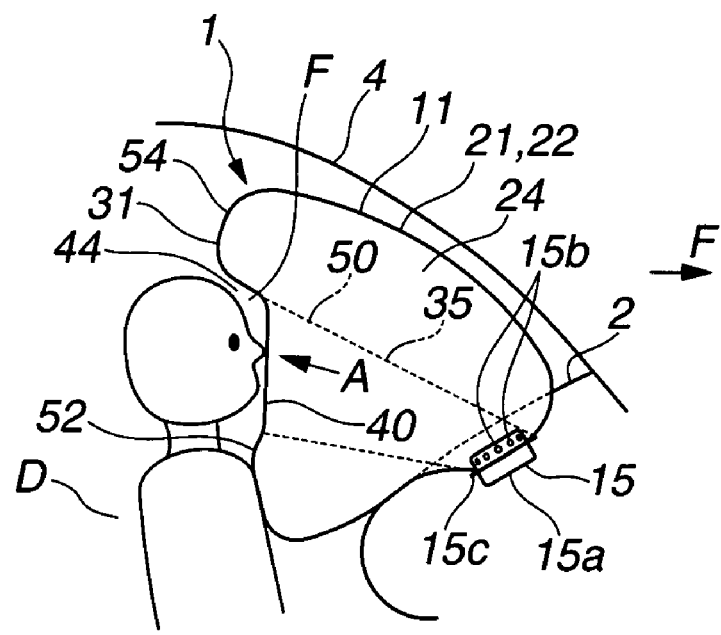
FIG. 4 is an illustrative view showing the air bag of FIG. 1 in the deployment state as viewed from the side.

When air bag 11 is inflated and deployed by the further supply of the gas to air bag 11, recessed portion 44 abuts on and presses head portion F of occupant D, as shown in FIG. 4. However, the other parts, that is lower expansion portion 52 and side expansion portions 53 abut on occupant D prior to recessed portion 44, and accordingly the impact applied to head portion F of occupant D is decreased. Moreover, head portion F is not pressed in first, and accordingly the large force is not applied to bent the neck portion of occupant D rearward. Therefore, occupant D is restrained to keep a posture between a body portion and head portion F to protect the neck portion.

In the air bag according to the embodiment of the present invention, front surface portion 31 of air bag 11 is provided with recessed portion 44 arranged to receive head portion F of occupant D, and at least three expansion portions 52, 53 and 53 surrounding this recessed portion 44. Accordingly, these expansion portions 52, 53 and 53 abut on occupant D, and restrains the position of occupant D at the initiation of the deployment. Recessed portion 44 softly abuts on and receives the head portion F (the face) of occupant D. Hence, it is possible to restrain and protect occupant D appropriately. Therefore, even when air bag 11 is deployed in the state that occupant D is located near air bag apparatus 1, it is possible to suppress the force applied by air bag 11 to occupant D.

Moreover, in the first embodiment of the present invention, there is provided upper expansion portion 54, and accordingly this upper expansion portion 54 and the upper portions of side expansion portions 53 and 53 inflated to avoid head portion F in the left and right directions enfold head portion F of occupant D. Consequently, it is possible to more appropriately protect head portion F.

Moreover, recessed portion 44 of air bag 11 is formed by folding back the base cloth forming front surface portion 31 at opening 41, and it is possible to form recessed portion 44 by sewing the edge portions of the superimposed portions, and to facilitate works such as the sewing. Moreover, this recessed portion 44 is connected to the mounted member (to be mounted) by connection section 50, and it is possible to readily form recessed portion 44 having stable shape, to readily form air bag 11 which is in the form of two mountain shape in the section, and to decrease the manufacturing cost.

Moreover, in recessed portion 44, the base cloth is folded in advance, on the mounted member's side to form bottom portion 40, and accordingly it is possible to suppress the force applied to connection section 50, to simplify the structure of connection section 50, and to decrease the manufacturing cost.

Besides, the panel structure of air bag 11 is not limited to the above-described structure of the embodiment, and another structure may be employed. Moreover, the panel of air bag 11 can be applied to air bag apparatuses 1 provided to other parts, in addition to air bag apparatus for the occupant seated in the passenger seat.

Next, an air bag 11 according to a second embodiment of the present invention will be illustrated. This air bag 11 is provided to a boss portion of a steering wheel main body of a steering wheel confronting a driver's seat. Air bag 11 is deployed in a circular shape as viewed from a front side. Air bag apparatus 1 provided with this air bag 11 is supported by the steering wheel main body through a horn plate or bracket portion (not shown). Air bag apparatus 1 includes the bag-shaped air bag 11, a base plate and a retainer serving as a support member, a cover member made from a synthetic resin, and an inflator 15 arranged to discharge the gas.

Air bag 11 is formed into a flat circular bag shape as viewed from the front side by sewing outer circumferences of a plurality of base cloths (three fabrics 71, 72 and 73 in the second embodiment). Moreover, a fourth base cloth 74 is disposed within the bag portion of air bag 11. Air bag 11 includes a front surface portion 31 formed by first base cloth 71 and second base cloth 72, and confronting occupant D; and a back surface portion formed by third base cloth 73, and confronting the vehicle body's side (the non-front surface A's side, the non-occupant D side).

Figure 6A:
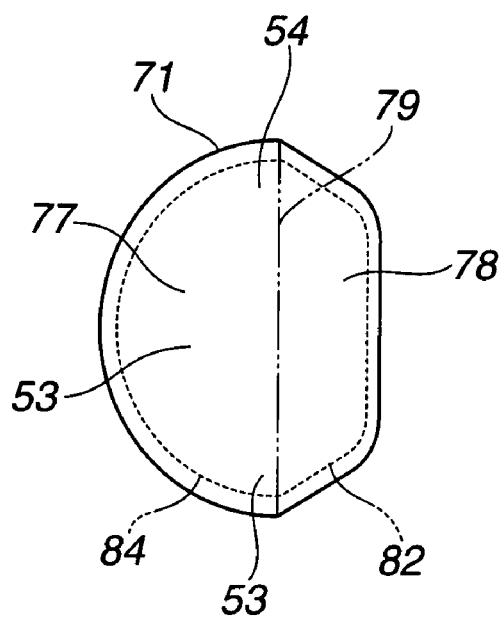
FIGS. 6A~6D are illustrative views showing base cloths forming the air bag of FIG. 1.
Figure 6B:
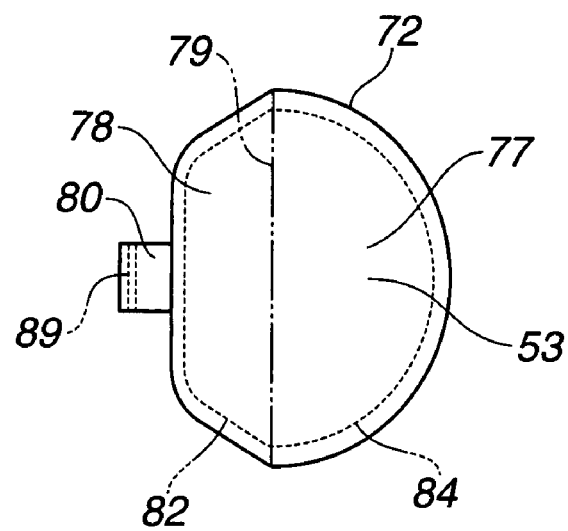

Each of first base cloth 71 shown in FIG. 6A and second base cloth 72 shown in FIG. 6B includes, respectively, semicircle front surface portion forming portions 77 forming front surface portion 31 by combining with each other; recessed portion forming portions 78 each of which is in the form of a substantially trapezoid, and each of which extends from one of front surface portion forming portions 77 through a folding line folded at a substantially 90°. Second base cloth 72 includes a connection section connecting portion 80 extending from an end portion of recessed portion forming portion 78. These first and second base cloths 71 and 72 are sewed at sewing lines 82 extending along edge portion (hem portion) of recessed portions 78, in a state that folding lines 79 of first and second base cloths 71 and 72 are aligned with each other, and moreover sewed with each other at upper end portions and lower end portions of bending lines. Consequently, an opening 41 of recessed portion 44 is formed at a central portion. Accordingly, air bag 11 is formed with a lower expansion portion 52 located below this recessed portion 44, side expansion portions 53 located on the both sides of recessed portion 44, and front surface portion 31 formed with an upper expansion portion 54 located above recessed portion 44.

Figure 6C:
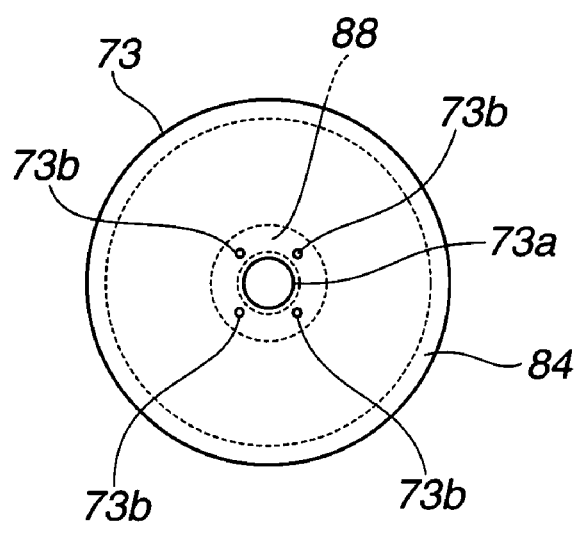

Moreover, third base cloth 73 as shown in FIG. 6C is airtightly (sealingly) joined to first and second base cloths 71 and 72 forming front surface portion 31, at a substantially circular outer circumference line 84 along an outer circumference portion, and is formed into a bag-shape with first and second base cloths 71 and 72. Moreover, this bag is reversed to form an outer shell of air bag 11. Third base cloth 73 includes a gas induction opening located at a center portion thereof, and four bolt through holes 73b located radially outside this gas induction opening 73a.

Figure 6D:
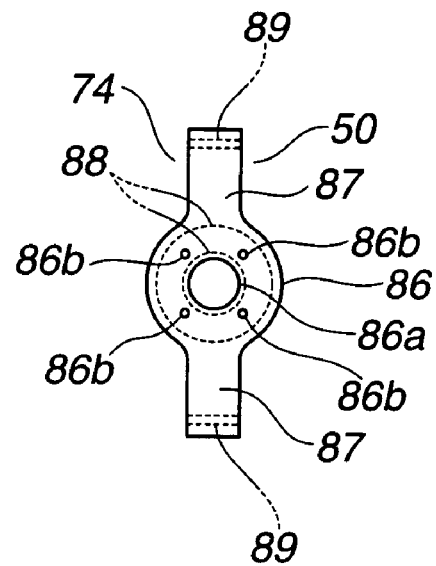

Moreover, fourth base cloth 74 shown in FIG. 6D forms connection section 50, and includes a circular joining portion 86, and connection section forming portions 87 and 87 extending from joining portion 86 in the opposite directions. Joining portion 86 is formed with a gas induction opening 86a, and four bolt through holes 86b, like third base cloth 73. Joining portion 86 of this fourth base cloth 74 is superimposed on the center portion of third base cloth 73 in a state that gas induction openings 73a and 86a are aligned with each other, and bolt through holes 73b and 86b are aligned with each other, and then joined to third base cloth 73 by double sewing lines 88. Moreover, in a state in which connection section forming portions 87 and 87 are risen to the front surface A side, end portions of connection section forming portions 87 and 87 connected with connection section connecting portion 80 by joining portions 89 such as sewing lines, to form connection section 50, and consequently air bag 11 is formed.

Then, the base plate is superimposed on the back side of third base cloth 73. The base plate, third base cloth 73, fourth base cloth 74, and flange portion 15c of inflator 15 whose inflator main body 15a is inserted from the back side of the base plate to gas induction openings 73a and 86a are superimposed. The bolts of the retainer are inserted through bolt through holes 73b and 86b and the bolt through holes provided in the flange portion, and tightened from the back side by nuts. Moreover, air bag 11 is folded into a predetermined shape, and covered with the cover member, so that air bag apparatus 1 is formed.

In this air bag apparatus 1, when air bag 11 is deployed from the steering wheel to the occupant D side (the front surface A side), three expansion portions 52, 53 and 53 abut on occupant D, and restrain the position of occupant D at the initiation of the deployment. Consequently, recessed portion 44 softly abuts on and receives head portion F (the face) of occupant D, and it is possible to restrain and protect occupant D appropriately.

Figure 5:
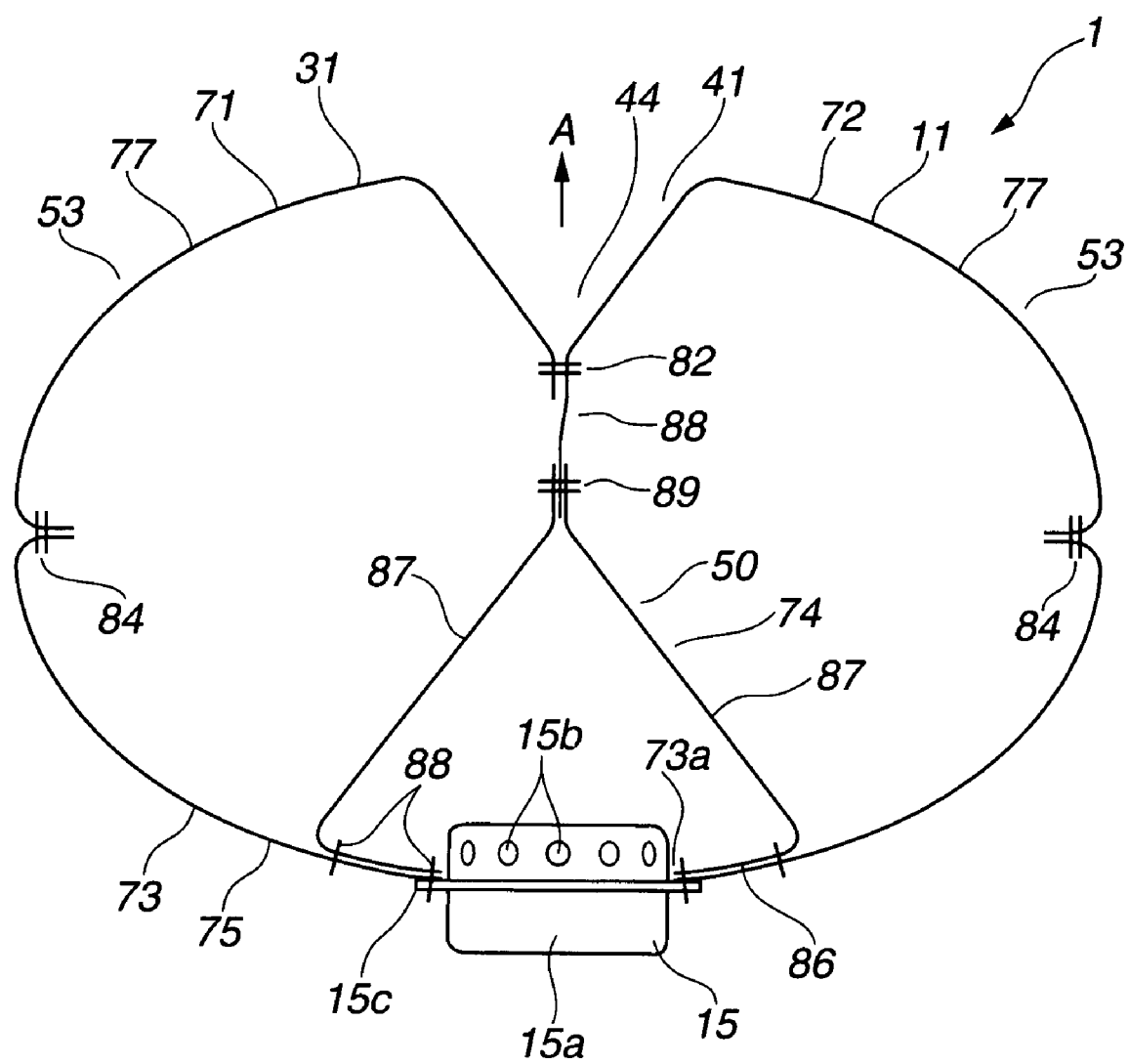
FIG. 5 is a sectional view showing an air bag in a deployment state, according to a second embodiment of the present invention.
Figure 7:
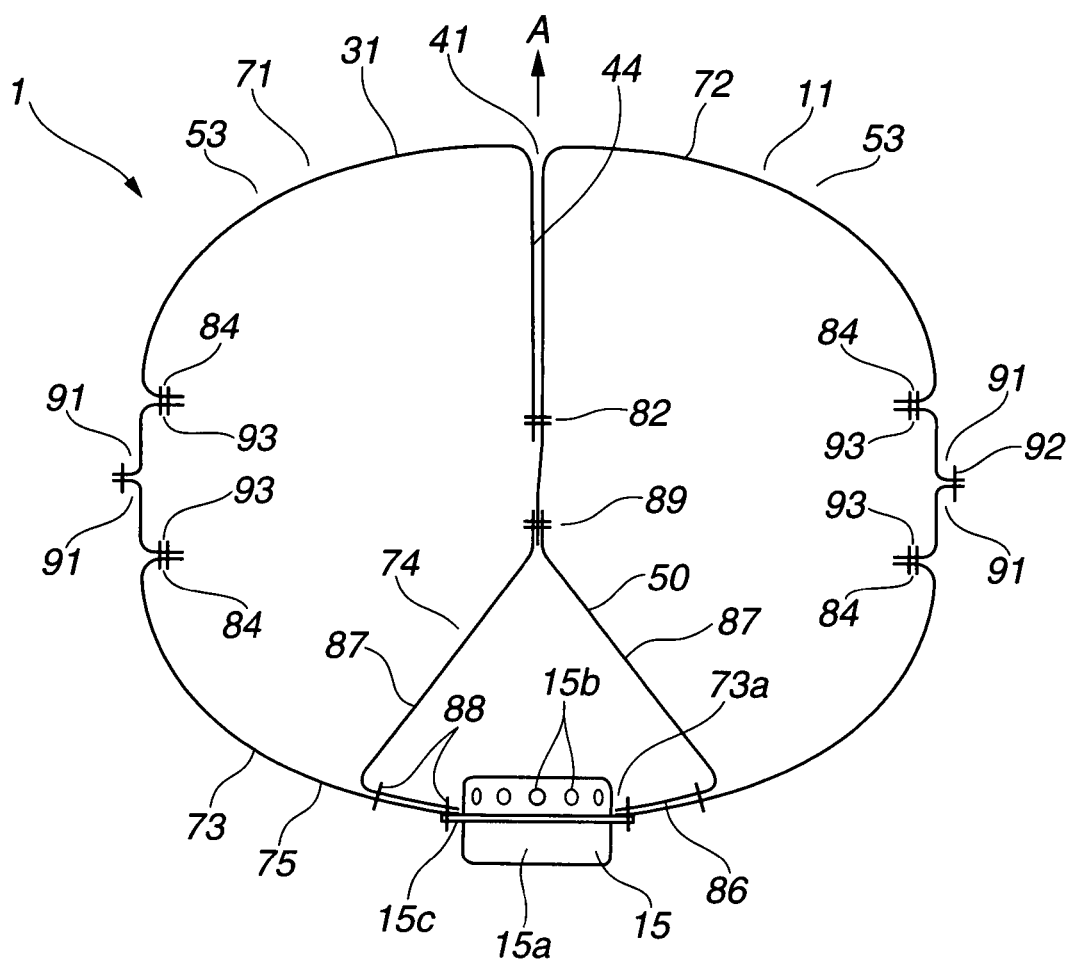
FIG. 7 is a sectional view showing an air bag in a deployment state, according to a third embodiment of the present invention.

Moreover, in air bag 11 as shown in FIGS. 5~7, in case of increasing a size that the air bag inflates from the steering wheel to the occupant D side (the front surface side), that is a stroke for absorbing the impact, the sizes of base cloths 71, 72 and 73 may be increased, and it is optional to combine base cloths which are different members.

Figure 8:
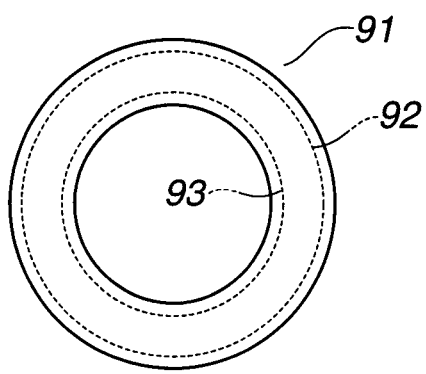
FIG. 8 is a plan view showing a base cloth forming the air bag of FIG. 7.

For example, as shown in FIGS. 7 and 8, two annular fifth fabrics 91 are used, and outer circumference portions of fifth fabrics 91 are airtightly joined with each other along outer sewing lines 92 of fifth base cloths 91. Inner circumference portions of fifth base cloths 91 are airtightly joined, respectively, to outer circumference joining lines 84 of first and second base cloths 71 and 72, along inner circumference sewing lines 93. Consequently, it is possible to form air bag 11 slightly larger than air bag 11 shown in FIG. 5. That is, it is possible to improve versatility of components, and to improve the manufacturing cost.

Besides, it is optional to employ, as the steering wheel, non-rotation type that the boss portion is not rotated with respect to the vehicle body, that is occupant D, even when the steering wheel main member is rotated.

Besides, in the above-described embodiments, recessed portion 44 is formed in the joining portion of two base cloths which are different members. The structure is not limited to this structure, and it is optional to form recessed portion 44 by folding and superimposing a fabric in a wave shape.

This invention is applicable to an air bag provided to a boss portion of a steering wheel and an instrument panel of a vehicle.

An air bag deployed from a mounted member mounted with the air bag toward an occupant by an insertion of a gas, the air bag includes a front surface portion confronting the occupant, the front surface portion being arranged to be deployed toward the occupant. The front surface portion includes a lower expansion portion arranged to inflate to abut on a breast portion of the occupant, a pair of side expansion portions arranged to inflate to left and right sides of a head portion of the occupant to avoid the head portion of the occupant, and a recessed portion surrounded by the lower expansion portion and the side expansion portions, and recessed toward the mounted member.

In the air bag according to the embodiment of the present invention, in the deployed front surface portion of the air bag, the lower expansion portion abuts on the chest portion of the occupant, that is the neck portion below the jaw, and the side expansion portions on the left and right sides avoid the head portion of the occupant, and abut on the shoulder portions. The recessed portion abuts on the head portion of the occupant by the impact smaller than the impact by the lower expansion portion and the side expansion portions, in a state that at least three portions restrain the occupant, and consequently the head portion is restrained and the occupant is protected. Accordingly, it is possible to restrain the head portion of the occupant by the impact smaller than the impact on another parts, and to protect the head portion of the occupant appropriately.

In the air bag according to the embodiment of the present invention, the front surface portion includes an upper expansion portion arranged to inflate on an upper side of the head portion of the occupant to avoid the head portion. The recessed portion is surrounded by the upper expansion portion, lower expansion portion and the side expansion portions.

In this structure, the upper portions of the side expansion portions and the upper expansion portion are deployed to avoid the head portion, and to enfold the head portion. Consequently, it is possible to restrain the head portion, and to protect the occupant.

In the air bag according to the embodiment of the present invention, the front surface portion is formed of a base fabric; the recessed portion is formed by folding back the base fabric forming the front surface portion toward a bottom portion on the mounted member's side. The recessed potion includes a connection section connecting the bottom portion of the recessed portion and the mounted member.

In this structure, the base cloth is folded back, and connected to the mounted member by the connection section. Accordingly, it is possible to readily form the recessed portion having the stable shape. The base cloth of the recessed portion is folded back, in advance, to the mounted member's side as the bottom portion. Accordingly, it is possible to suppress the force applied to the connection section, to simplify the structure of the connection section, and to decrease the manufacturing cost.

In the air bag according to the embodiments of the present invention, in the deployed front surface portion of the air bag, the lower expansion portion abuts on the breast of the occupant, that is the neck portion below the jaw, and the side expansion portions on the left and right sides avoid the head portion of the occupant, and abut on the shoulder portions. Consequently, the occupant is restrained by at least three portions, the recessed portion abuts on the head portion of the occupant by the impact smaller than the impacts by the lower expansion portion and the side expansion portions, and the head portion is restrained and the occupant is protected. Accordingly, it is possible to restrain the head portion of the occupant by the impact smaller than the impacts by the other parts.

This application is based on a prior Japanese Patent Application No. 2006-126821. The entire contents of the Japanese Patent Application No. 2006-126821 with a filing date of Apr. 28, 2006 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air bag deployable from a mounted member mounted with the air bag toward an occupant by an insertion of a gas, the air bag comprising:
   a front surface portion confronting the occupant, the front surface portion being arranged to be deployed toward the occupant, the front surface portion including;
      a lower expansion portion arranged to inflate to abut on a breast portion of the occupant;
      a pair of side expansion portions arranged to inflate to left and right sides of a head portion of the occupant to avoid the head portion of the occupant; and a recessed portion surrounded by the lower expansion portion and the side expansion portions, and recessed toward the mounted member; and a connection section having a predetermined length, and extending from a first end connected to a bottom portion at a base end of the recessed portion to a second end which connects to the mounted member, wherein the air bag is deployed towards the occupant in a deploying direction, and wherein an opening of the recess portion extends further in an upward and downward direction in a direction of gravity than in a left to right direction which is perpendicular to both the deploying direction and the gravitational direction.

2. The air bag as claimed in claim 1, wherein the front surface portion includes an upper expansion portion arranged to inflate on an upper side of the head portion of the occupant to avoid the head portion.

3. The air bag as claimed in claim 2, wherein the recessed portion is surrounded by the upper expansion portion, lower expansion portion and the side expansion portions.

4. The air bag as claimed in claim 1, wherein the connection section separates the bottom portion of the recessed portion from the mounted member.

5. The air bag as claimed in claim 1, wherein the lower expansion portion abuts the breast portion of the occupant before the head portion comes into contact with the bottom portion of the recessed portion.

6. The air bag as claimed in claim 1, wherein the front surface portion is formed of a base fabric and the recessed portion is formed by folding back the base fabric at a center of the front surface towards the first end of the connection section such that the base cloth forms a pair of sides of recessed portion in a V-shape which connects at the bottom portion of the recessed portion.

7. The air bag as claimed in claim 2, wherein the upper expansion portion, the lower expansion portion, and the pair of side expansion portions enfold the head portion of the occupant such that only the recessed portion allows the head and a neck of the occupant to maintain a normal posture.

8. The air bag as claimed in claim 1, wherein the front surface portion comprises a first base cloth and a second base cloth which are attached to each other, and wherein the first and second base cloths comprise a right side and a left side, in a direction which is perpendicular to both the deploying direction and the gravitational direction, of an opening of the recessed portion, respectively.

9. A method of restraining an occupant using an air bag comprising:

providing an air bag mounted to a vehicle, the air bag comprising:

a front surface portion confronting the occupant, the front surface portion being arranged to be deployed toward the occupant, the front surface portion including:

a lower expansion portion arranged to inflate to abut on a breast portion of the occupant;

a pair of side expansion portions arranged to inflate to left and right sides of a head portion of the occupant to abut shoulder portions of the occupant;

a recessed portion surrounded by the lower expansion portion and the side expansion portions, and recessed toward the mounted member; and a connection section having a predetermined length, and extending from a first end connected to a bottom portion at a base end of the recessed portion to a second end which connects to the mounted member; and expanding the air bag such that at least one of the lower expansion portion and the pair of side expansion portions abut at least one of the breast portion and the shoulder portions of the occupant before the head portion comes into contact with the recessed portion.

* * * * *